United States Patent [19]

McDermott

[11] Patent Number: 5,254,611
[45] Date of Patent: Oct. 19, 1993

[54] WATER DISPERSABLE URETHANE ACRYLATE OLIGOMER

[75] Inventor: Michael D. McDermott, Yardley, Pa.

[73] Assignee: Henkel Corporation, Plymouth Meeting, Pa.

[21] Appl. No.: 906,812

[22] Filed: Jun. 30, 1992

[51] Int. Cl.$^5$ ............................................. C08L 75/04
[52] U.S. Cl. ................................... 524/198; 524/199; 526/301; 528/49; 427/496; 427/500; 427/508; 427/514; 427/551; 427/558; 252/182.18; 562/553; 562/555; 562/561
[58] Field of Search ................ 524/198, 199; 526/301; 528/49; 427/496, 500, 508, 514, 551, 558; 252/182.18; 562/553, 555, 561

[56] References Cited

U.S. PATENT DOCUMENTS

| | | | |
|---|---|---|---|
| 3,479,310 | 11/1969 | Dieterich et al. | 260/29.2 |
| 4,094,842 | 6/1978 | Wenzel et al. | 260/29.2 |
| 4,098,933 | 7/1978 | Bayer | 528/45 |
| 4,460,738 | 7/1984 | Frentzel et al. | 524/591 |
| 4,722,966 | 2/1988 | Flakus | 524/840 |

FOREIGN PATENT DOCUMENTS 2017013  11/1990  Canada .
1076688  7/1967  United Kingdom .

OTHER PUBLICATIONS

"Waterborne Polyurethanes"—*Advances in Urethane Science and Technology*, V10, pp. 148-150 (not available).

"Radiation-Curable Water-Borne Urethane for the Wood Industry"—*Modern Paint and Coatings*, Jun. 1990, pp. 44-47.

"Applications of Radiation Curable Water-Thinnable Resins in Coatings"—*Radiation Curing*, V180, pp. 150-154.

*Primary Examiner*—Maurice J. Welsh
*Attorney, Agent, or Firm*—Ernest G. Szoke; Wayne C. Jaeschke; Frank S. Chow

[57] ABSTRACT

Urethane oligomers having the formula:

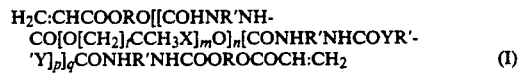

as well as process therefor are described. These oligomers are photocurable and useful as coatings and ink.

19 Claims, No Drawings

WATER DISPERSABLE URETHANE ACRYLATE OLIGOMER

FIELD OF THE INVENTION

The present invention relates to radiation curable oligourethanes. More particularly, it relates to water dispersible acrylated urethane oligomers as well as a process, free from the use of low boiling organic solvents, for the production of these products.

DESCRIPTION OF THE PRIOR ART

The technology for the production of aqueous anionic polyurethane dispersions is well known. British patent no. 1,076,688 discloses a process for the production of aqueous polyurethane dispersions by treating isocyanate terminated prepolymers with carboxyl containing compounds. These compounds have at least one group capable of reacting with isocyanate, but more typically two groups capable of reacting with isocyanate in order to effect chain extension concurrently with the incorporation of the dispersing monomer. This chain extension is typically performed in a low boiling organic solvent, i.e. acetone, which allows for the buildup of high molecular weight urethanes while maintaining sufficiently low viscosities to effect dispersion. The solvent is then stripped under vacuum after dispersion in water. Water dispersibility is achieved by treating the carboxyl containing solution with a base capable of effecting salt formation with the pendant acid moiety.

U.S. Pat. No. 3,479,310 utilizes similar processes, but discloses the use of lower concentrations of carboxylates, typically but not necessarily in the presence of a quaternizable amine which has been reacted into the urethane backbone. Whereas the above mentioned British patent discloses the use of 1-15% of the salt type group, this patent refers to dispersions containing 0.02-1% of the anionic salt. Again, the prepolymer method is utilized wherein the prepolymer is taken up in acetone and chain extended. After salt formation, the urethane may be dispersed in water and the solvent, if desired, may be removed.

U.S. Pat. No. 4,460,738 discloses a process for the production of acid grafted polyether diols by reacting unsaturated diacids, i.e. maleic, fumaric and itaconic or mixtures thereof. The reaction is carried out in the presence of a peroxy-type free radical initiator. These diols are then utilized to produce urethane prepolymers which are then typically diluted in 20% diethyl ketone. The prepolymers are then vigorously stirred into a mixture of water and triethylamine, and subsequently chain extended with ethylenediamine.

All of the above processes involve the solvation of urethane prepolymers in a low boiling organic solvent, which today must necessarily be at least partially removed in order to comply with federal V.O.C. requirements. Since chain extension typically occurs after or during dispersion in water, the use of aromatic isocyanates is severely limited due to their high reactivity with water. These processes are time consuming and laborious. Solvent must be recovered and cannot generally be reused directly, due to the codistillation of minor amounts of water. Larger than necessary reactor volumes are required in order to accommodate the solvent requirements. Additionally, the need for low boiling solvents-lower than the boiling point of water-unnecessarily subjects the manufacturer to a greater risk of explosion or fire.

These non-crosslinkable dispersions must rely on their high molecular weight to achieve final film properties. More recently, reactive aqueous dispersions of urethane oligomers have been described, see for example, "Waterborne Polyurethanes" in *Advances in Urethane Science and Technology*, V10, pp 148-150, and the references contained therein. See also U.S. Pat. No. 4,098,933. Typically, these oligomeric urethane dispersions are reacted after deposition onto a substrate, allowing the build up of high molecular weight previously designed into the dispersed particles during synthesis. When both components are difunctional, chain extention occurs, and if the functionality of either oligomer is greater than two, true crosslinking can occur. The crosslinking can be achieved by, for example, reacting an amino or hydroxy functional hydrophilic urethane with a second hydrophilic urethane containing, for example, a blocked isocyanate. After deposition and subsequent removal of water, the isocyanate may be unblocked at elevated temperatures. The isocyanate containing urethane may then react with the amino or hydroxy moiety. Again, acetone is typically used in the production of these blocked isocyanate urethane dispersions, however, with the lower molecular weight of the urethane chain, the solvent requirements may be greatly reduced.

The use of formaldehyde crosslinked dispersible urethane oligomers has been described in U.S. Pat. No. 4,094,842. Here again, elevated temperatures are typically required.

Most recently, interest has turned toward the production of aqueous urethane dispersions capable of being crosslinked upon exposure to ultraviolet light or electron beam. These materials may be prepared by the traditional acetone process, see for example U.S. Pat. No. 4,722,966 wherein urethane prepolymers containing cycloaliphatic isocyanates have been partially acrylated, taken up into acetone and reacted with an amine carboxylate. The process also describes the use of typical chain extenders, i.e. diamines. After salt formation and dispersion, the solvent is removed under vacuum.

Canadian patent no. 2,017,013 discloses a radiation curable anionic aqueous oligourethane dispersion wherein isophorone diisocyanate is reacted with hydroxy acrylates at 25° to 50° C. in an equivalent ratio of NCO to OH of 3:1 to 5:1. This partially acrylated isocyanate is further reacted with COOH containing ester polyols made from polyols and dicarboxylic anhydrides. The process is carried out in the absence of solvent at 50° to 100° C. with the formation of substantially NCO-free, COOH containing urethane acrylate oligomers. The oligomer is then dispersed at 90° to 95° C. using aqueous solutions of bases. It is, according to the above disclosure, necessary to avoid the use of typical acid containing salt forming monomers, for example, dimethylol proprionic acid, due to substantial reaction of the monomers acid moiety with isocyanate. These products tend to be water sensitive but unable to form stable dispersions.

Other waterborne radiation curable polyurethane dispersions have been reported. See for example "Radiation-Curable Water-Borne Urethane for the Wood Industry", *Modern Paints and Coatings*, June 1990, pp 4–47. Please see also "Applications of Radiation Curable Water-Thinnable Resins in Coatings",

*Radiation Curing*, V180, pp 150-154, in which water soluble urethane acrylates are described.

SUMMARY OF THE INVENTION

The present invention is directed to a new and novel class of anionic urethane dispersions and process therefor. The urethane oligomers of this invention may be represented by formula I:

$$H_2C{:}CHCOORO[[COHNR'NH\text{-}CO[O[CH_2]_tCCH_3X]_mO]_n[CONHR'NHCOYR'\text{-}Y]_p]_qCONHR'NHCOOROCOCH{:}CH_2 \quad (I)$$

wherein R is alkyl or aryl; R' is an aliphatic or aromatic moiety; R" is $C_1$ to $C_{10}$ alkyl, macro polyester or polyether, the molecular weight of which is generally from about 300 to about 3000; X is H or alkyl COOH; Y is NH or O; m, n, t and q are positive integers; and p is zero or a positive integer.

Among the compounds which fall within I above are those in which R is $C_1$–$C_6$ alkyl or phenyl; R' is methylene bis cyclohexyl, isophorone, $C_2$–$C_{10}$ alkyl, tetramethylxylene, or toluene; and R" is a reaction product of $C_2$–$C_6$ alkylene glycol and $C_2$–$C_6$ diacids, or $C_2$–$C_4$ polyether segments, or $C_2$–$C_8$ alkyl; m is 5 to 30; n is 1 to 5; p is zero to 20, q is 1 to 10 and t is 1 to 5.

A preferred compound of the invention has the formula II:

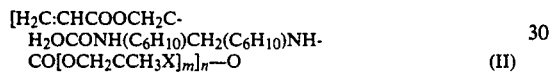

$$[H_2C{:}CHCOOCH_2C\text{-}H_2OCONH(C_6H_{10})CH_2(C_6H_{10})NH\text{-}CO[OCH_2CCH_3X]_m]_n\text{—}O \quad (II)$$

wherein X is H or alkyl COOH.

The oligomer of this invention can be dispersed in water to a high solids content, i.e. about 80%, although it can also be dispersed at about 10%, but more typically it is dispersed at about 40 to about 60% solids. It appears as a milky white low viscosity dispersion with a particle size that ranges from 100 to 2000 nm averaging 400 nm.

The dispersion, after application to a substrate and following the removal of water, is photocurable with known suitable initiators, i.e., alpha cleavage and hydrogen abstraction initiators.

In addition, the dispersion, in contrast to prior art anionic dispersion, is freeze-thaw stable, and can be readily blended with non-dispersible oligomers, e.g. acrylated urethanes, and monomers forming stable dispersions.

Broadly speaking, this oligomer is prepared by forming a mixture of an alkyl acid grafted polyether polyol, a hydroxy alkyl acrylate, and a suitable salt forming agent, e.g. a weak base. It is then reacted in the presence of a urethane catalyst at about 40° to 80° C. with an aliphatic or aromatic di- or multifunctional isocyanate. When the isocyanate reaction is complete, the reaction mixture is cooled and dispersed in water.

DETAILED DESCRIPTION OF THE INVENTION

According to the process of this invention, the oligomers are prepared by forming a mixture of an acid grafted diol of formula III:

$$HO[[CH_2]_tCCH_3XO]_m\text{—}H \quad (III)$$

in which X is H or alkyl acid and m and t are as defined above and having a molecular weight of from about 300 to 3000 with a hydroxy acrylate of formula V:

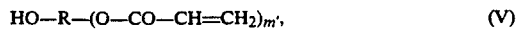

$$HO\text{—}R\text{—}(O\text{—}CO\text{—}CH{=}CH_2)_{m'}, \quad (V)$$

in which R is alkyl or aryl and m' is typically 1 to 5, in the presence of a sufficient amount of a salt forming agent such as weak base to form the carboxylic salt.

The mixing is typically carried out under a blanket of dry air at room temperature for at least five minutes using a simple blending procedure in a vessel.

The mixture is then heated to a temperature of about from 40° to 100° C. and typically about 60° C. At this time, a catalytic amount of a urethane catalyst, e.g. dibutyl tin dilaurate, is added followed by addition of a compound the formula IV:

$$R'\text{—}(NCO)_{n'}, \quad (IV)$$

in which R' is as defined and n' is typically 2 to 4, at a rate which maintains the desired reaction temperature.

When the addition is complete, the reaction is held for about from 2 to about 4 hours or until the NCO content is <0.5% by weight as measured for example by titration with dibutyl amine. Thereafter, the reaction is cooled to from about 45° to 55° C. The cooled mixture is dispersed in water yielding the desired oligomer dispersion of this invention.

The reaction with the isocyanate can be effected with or without a compound of the formula:

$$Y'\text{—}R''\text{—}Y' \quad (VI)$$

in which Y' is $NH_2$ or OH and R" is as defined above.

Compound VI, useful in the present invention, embraces those having an active hydrogen. Generally speaking the NCO to OH ratio of compound IV to compound III, V and VI is approximately equal to one. The molecular weight of III is from about 300 to about 3000.

The most suitable compounds are polyhydroxyl compounds which include polyalkylene ether glycols, dihydroxyl polyesters, including dihydroxy polyesteramides, dihydroxy polyacetate and dihydroxy polythioethers. It is preferred to use those polyalkylene glycol diols which are predominantly linear and which have a molecular weight of from about 300 to 3000.

Any suitable polyalkylene ether glycol may also be used including those prepared from tetrahydrofuran, propylene oxide, co-polymerization products or graft polymerization products of these compounds such as the products of the addition of polyalkylene oxide and the like.

Compound VI also embraces chain lengthening agents with active hydrogen atoms. The agents useful herein include, for example, the usual glycols such as ethylene glycol, di-, tri- and tetraethylene glycol, 1,4-butane diol, 1,3-propane diol and its isomers, neopentyl glycol, pentaerythryltol, hexane diol and also diamines, e.g. diamine ethylene, hexamethylenediamine, benzidine, diaminodiphenylmethane, and aminoalcohols such as ethanol amine. Water, hydrazine and ammonia may also be used as chain extenders.

Suitable salt-forming agents are inorganic and organic bases, e.g. sodium hydroxide, potassium hydroxide, potassium carbonate, sodium hydrogen carbonate and amines. However, weak organic bases such as triethylamine are most preferred.

Compound IV include any suitable organic polyisocyanates, but it is preferred to use organic diisocyanates and especially aliphatic and aromatic diisocyanates such as, for example, 1,5-naphthylene diisocyanate, 4,4'-diphenylmethane diisocyanate, 4,4'-diphenyldimethylmethane-diisocyanate, di- and tetralkyl-diphenylmethane diisocyanate, 4,4'-dibenzyl diisocyanate, 1,3-phenylene diisocyanate, 1,4-phenylene diisocyanate, toluene diisocyanate, chlorinated and brominated isocyanates, isocyanates containing phosphorous, butane-1,4-diisocyanate, hexane-1,6-diisocyanate, dicyclohexylmethane diisocyanate, and cyclohexane-1,4-diisocyanate, tetramethylxylene diisocyanate and isophorone diisocyanate.

The foregoing process offers several advantages over the prior art method. It avoids the use of classical solvents such as acetone and the problems associated with their removal by vacuum distillation. Neither does the present process require the formation of a prepolymer. Also, the process can utilize low cost aromatic isocyanates which are not typical in the prepolymer method because of the reactivity of the isocyanate with water thereby lowering the overall cost of manufacture. Moreover, because of the higher solids content of the dispersion, the transport problems arising from high water content of the dispersion is reduced as well as the cost to dry the dispersion after application to a substrate.

The dispersion in water usually contains 10 to 80% and most typically 40 to 60% of the oligomer. The aqueous dispersion of the present invention can be applied to a variety of substrates. These include, for example, porous stock such as paper and cardboard, wood and wood products, metals such as aluminum, copper, steel, and plastics such as P.V.C., polycarbonates, acrylic and the like. After addition of a suitable photoinitiator, e.g., PHOTOMER 51 ® brand photoinitiator (benzyl dimethyl ketal), the dispersions are applied by methods such as spraying, rollcoating, flexo and gravure processes onto a selected substrate. The resulting coated substrate, e.g., a paper, is typically cured under a UV or electron beam radiation. The dispersions may optionally include other substances such as pigments, resins, monomers and additives such as anti-oxidants and rheological modifiers.

In order to further illustrate the practice of this invention, the following examples are included.

EXAMPLE 1

To 330 g (1 equivalent of an acid grafted polypropylene glycol diol (PWB 500 supplied by Union Carbide), neutralized with a trace amount of concentrated sulfuric acid, is added 116 g (1 equivalent) hydroxy ethyl acrylate (supplied by Dupont). Triethylamine (46 g) is then added to the above mixture and the entire mixture is stirred under dry air blanket for 15 minutes to assure salt formation. The resulting mixture is an opaque yellow liquid, to which 300 ppm butylated hydroxy toluene is then added.

After heating above mixture to 60° C., a catalytic amount of dibutyl tin dilaurate is then added, followed by 262 g (2 equivalents) of an aliphatic diisocyanate (Desmodur W supplied by Miles). The rate of addition is such that the reaction temperature is maintained at 60° C.+/−2° C. After isocyanate addition is complete and the exotherm has subsided, the reaction temperature is raised and held to between 65° to 70° C. for 2 to 4 hours. The reaction temperature is then dropped to between 45° and 55° C.

Distilled water which has been warmed to reaction mixture temperature is then added to the reaction mixture, to effect a 40% solids milky white dispersion which when cooled to room temperature has a viscosity of 65 cps and a mean particle diameter of 400 nm. When a suitable photoinitiator is added, the dispersion may be drawn down on paper to effect a 1 mil dry film thickness and immediately photocured to a water resistant, abrasion resistant film which shows outstanding adhesion to the substrate.

EXAMPLE 2

The dispersion prepared in example 1 is heated to 60° to 70° C. after which a hydrophobic acrylated urethane oligomer of M.W. 1900 (prewarmed to 60° to 70° C.) is added at a concentration of 40% by total weight resulting in a storage stable 57% solids dispersion which when mixed with a suitable photoinitiator and drawn down onto glass can be dried at 80° C. in less than 2 minutes. The resulting film when photocured is tough and flexible and withstands in excess of 100 MEK double rubs.

EXAMPLE 3

When subject to cyclic freeze thaw testing ranging from −10° to 25° C., the dispersion described in example 1 shows no tendency to phase separate or coagulate and remains a low viscosity homogenous dispersion.

EXAMPLE 4

A mixture of 0.5 eq PWB-1200 (Union Carbide), 1 equivalent hydroxyethyl acrylate and 23 g triethyl amine is heated to 60° C. and catalyzed with dibutyl tin dilaurate. 2 equivalents (0.5 eq excess) isophorone diisocyanate is added dropwise and the reaction continues for 4 hours. Room temperature deionized water is added dropwise to the reaction product to effect a viscous milky white dispersion at 40% solids which has been chain extended with water and which, when blended with a photoinitiator and drawn down on paper, can be photocured in 1 pass at 100 FPM. Viscosity 1100 cps.

EXAMPLE 5

Compound II may be formulated into a waterbased ink using known technologies and applied via flexography or gravure printing techniques on porous substrates, i.e. paper. When compared to currently available commercial acrylic emulsion resins, the dispersion comprising compound II has improved resistances to water, NaOH, ammonia and line lube oil.

| Commercially available Acrylic emulsion resin | H₂O | NaOH | Ammonia | Line Lube |
|---|---|---|---|---|
| G-Cryl (1138 Henkel) | 3 | 5 | 4 | 4 |
| ACX-12-661 (Henkel) | 8 | 3 | 3 | 3 |
| Compound II dispersion | 8 | 7 | 9 | 9 |

Scale 1–10 with 10 being the best

What is claimed is:

1. A photocurable acrylate oligomer having the formula:

H₂C:CHCOORO[[COHNR'NH-CO[O[CH₂]₄CCH₃X]ₘO]ₙ[CONHR'NHCOYR'-Y]ₚ]qCONHR'NHCOOROCOCH:CH₂  (I)

wherein R is alkyl or aryl; R' is an aliphatic or aromatic moiety; R" is $C_1$ to $C_{10}$ alkyl, macro polyester or polyether; X is H or alkyl COOH; Y is NH or O; n, m, q and t are positive integers; and p is zero or a positive integer.

2. A compound according to claim 1 wherein R is $C_1$-$C_6$ alkyl or phenyl; or R' is methylene bis cyclohexyl, isophorone, $C_2$-$C_{10}$ alkyl, tetramethylxylene, or toluene; and R" are reaction products of $C_2$-$C_6$ alkylene glycol and $C_2$-$C_6$ diacids or $C_2$-$C_4$ polyether segment or $C_2$-$C_8$ alkyl; m is 5 to 30; n is 1 to 5; t is 1 to 5; and p is zero to 20.

3. A compound according to claim 1 having the formula:

$$[H_2C{:}CHCOOCH_2CH_2OCONH(C_6H_{10})CH_2(C_6H_{10})NHCO[OCH_2CCH_3X]_m]_n{-}O \qquad (II)$$

wherein X is H or alkyl COOH.

4. A process for the production of the oligomer as defined in claim 1 which comprises forming a mixture of a diol of the formula:

$$HO[[CH_2]_qCCH_3XO]_m{-}H \qquad (III)$$

with a hydroxy acrylate of the formula:

$$HO{-}R{-}(O{-}CO{-}CH{=}CH_2)_{m'} \qquad (V)$$

in which m' is 1 to 5, in the presence of a sufficient amount of a salt forming agent to effect salt formation and then reacting the resulting mixture with a compound of the formula:

$$R'{-}(NCO)_{n'} \qquad (IV)$$

in the presence of a catalytic sufficient amount of urethane catalyst with or without a compound of the formula:

$$Y'{-}R''{-}Y' \qquad (VI)$$

wherein R' and R" are as defined and n' is 2 to 4 and Y' is $NH_2$ or OH.

5. A process according to claim 4 wherein the diol is pretreated with a mineral acid.

6. A process according to claim 4 wherein the compound IV is added at a rate which will maintain reaction temperature and reacting until the NCO content is <0.5% by weight.

7. A process according to claim 4 wherein the salt forming agent is a triethylamine.

8. An oligomer according to claim 1 wherein the M.W. of $$HO[[CH_2]_qCCH_3XO]_m{-}H \qquad (III)$$

is about 300 to 3000.

9. A process according to claim 1 wherein the reaction is effected at a temperature from about 40° to 100° C.

10. A process according to claim 9 wherein the temperature is about 60° C.

11. A process according to claim 3 wherein the catalyst is dibutyl tin dilaurate.

12. A process for the production of an oligomer as defined in claim 1 which comprises:
   a. forming a mixture of an acid grafted polypropylene glycol diol with hydroxyethyl acrylate neutralized with a trace amount of a mineral acid and triethylamine to effect the formation of the carboxylic salt;
   b. heating the mixture to about 40° to 100° C.;
   c. adding a catalytic amount of a urethane catalyst;
   d. adding a diisocyanate at a rate sufficient to maintain the reaction temperature;
   e. holding the reaction at the temperature for about 2 to 4 hours or until the NCO content is 0.5% by weight; and
   f. cooling the mixture and
   g. dispersing the resulting mixture in water.

13. A process according to claim 12 wherein the urethane catalyst is dibutyl tin dilaurate.

14. An aqueous dispersion comprising 10 to 80% of an oligomer selected from those defined in claim 1.

15. An aqueous dispersion according to claim 14 which comprises from about 40 to 60% of the oligomer as defined.

16. A process for applying a coating to a suitable substrate which comprises:
   a) mixing an effective amount of a photoinitiator with a dispersion as defined in claim 14;
   b) applying the resulting mixture on the said substrate; and
   c) allowing the dispersion to dry and thereafter cure under UV or electron beam radiation.

17. A process for applying a coating to a suitable substrate which comprises:
   a) mixing an effective amount of a photoinitiator with a dispersion as defined in claim 15;
   b) applying the resulting mixture on the said substrate; and
   c) allowing the dispersion to dry and thereafter cure under UV or electron beam radiation.

18. A process according to claim 16 which includes in the dispersion a member selected from the group consisting of pigments, resins, and monomers.

19. A process according to claim 17 which includes in the dispersion a member selected from the group consisting of pigments, resins and monomers.

* * * * *